United States Patent [19]
McDow

[11] 3,764,647
[45] Oct. 9, 1973

[54] METHOD OF ASSEMBLING UNIVERSAL JOINT YOKE AND SPIDER
[75] Inventor: William R. McDow, Saginaw, Mich.
[73] Assignee: General Motors Corporation, Detroit, Mich.
[22] Filed: Aug. 10, 1970
[21] Appl. No.: 62,278

[52] U.S. Cl.................. 264/242, 264/254, 264/262
[51] Int. Cl............................. B32b 1/00, B32b 3/30
[58] Field of Search ....................................
264/261–263, 242; 64/17 R

[56] References Cited
UNITED STATES PATENTS
3,241,336  3/1966  Nemtsov................................ 64/17
3,328,101  6/1967  Sullivan ............................ 264/242 X
2,954,992  10/1960  Baker.................................... 264/263
3,087,314  4/1963  Jarvis et al.......................... 64/17 R FOREIGN PATENTS OR APPLICATIONS
1,156,043  5/1958  France .............................. 64/17 R Primary Examiner—Robert F. White
Assistant Examiner—W. E. Hoag
Attorney—J. L. Carpenter and F. J. Fodale

[57] ABSTRACT

A yoke and spider assembly and its method of assembly is disclosed in which a spider is tilted and inserted into oversize bores in the yoke ears and bearing bushings are provided for the spider by a thermoplastic injection molded into the yoke ear bores.

8 Claims, 5 Drawing Figures

PATENTED OCT 9 1973  3,764,647

INVENTOR.
William R. McDow
BY
F. J. Fodale
ATTORNEY

METHOD OF ASSEMBLING UNIVERSAL JOINT YOKE AND SPIDER

My invention relates generally to a spider and yoke assembly such as is used in a Cardan universal joint and to its method of assembly.

Yoke and spider assemblies in the past have included yokes with split sockets in which the trunnions or their bearings were secured to the yoke ears by a separate piece fastened in some manner to the yoke to complete the socket. Prior known assemblies have also used oversize bores in the yoke ears with the bearing cups press fitted in the oversize bores from the outboard sides of the yoke ears to provide the bearings for the spider trunnions. Still another scheme has been the use of resilient yokes with the ears sprung apart elastically to permit the spider legs to pass the yoke ears, whereupon the ears were permitted to return to a normal condition capturing the spider leg trunnions.

Generally, the object of my invention is to improve generally upon these prior art devices and their method of assembly.

An object of my invention is to provide a yoke and spider assembly and a method of assembling it in which an integral yoke is utilized and in which close fitting bearings are provided for the spider trunnions, in a simple and efficient manner not requiring the springing or distortion of the yoke during assembly.

Another object of my invention is to provide a yoke and spider assembly comprised of a minimum number of parts and designed for ease of assembly in a unique and efficient manner.

Another object of my invention is to provide a spider and trunnion assembly and a method of assembling it in which an integral yoke is utilized while not requiring either springing or otherwise distorting of the yoke during assembly or the force fitting of parts or other material distorting-type operations.

Another object of my invention is to provide a method of assembling a spider to an integral yoke in which a thermoplastic is injection molded into the yoke bores to provide close fitting bearing bushings for the spider trunnions and to complete the assembly.

The exact nature of this invention as well as other objects and advantages thereof will be readily apparent from consideration of the following specification relating to the annexed drawing in which.

Figure 1:
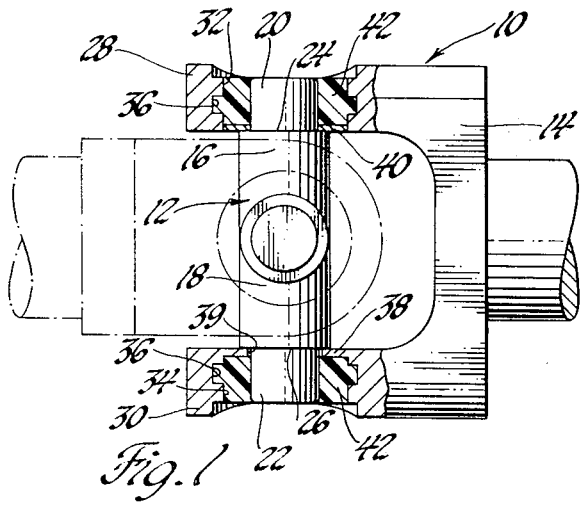
FIG. 1 is a front view of a Cardan universal joint with one yoke shown in phantom and the other yoke shown partially in section to illustrate a spider and yoke assembled in accordance with my invention.

Referring now to the drawing and more specifically to FIG. 1, my assembly method can be used in the assembly of a Cardan joint such as is indicated generally at 10. The Cardan joint comprises two yokes connected by a spider for transmitting power between angularly related rotating shafts. For clarity, one of the yokes is shown in phantom and my assembly method will be explained in conjunction with assembling the spider 12 to the other yoke 14. However, it is to be understood that the second yoke may be assembled to the spider 12 and yoke 14 assembled in accordance with my invention.

The spider 12 includes two diametrically opposed legs 16 and 18 terminating in undercut trunnions 20 and 22, respectively. The trunnions 20 and 22 being undercut, therefore, have annular shoulders 24 and 26 immediately adjacent them respectively.

The yoke 14 has ears 28 and 30 with aligned bores 32 and 34 adapted to receive the trunnions 20 and 22, respectively. Each bore is substantially larger in diameter than the spider legs and trunnions and each bore includes an annular internal groove 36 opening into it. The lower yoke ear 30 includes an integral, radially extending flange 38, which defines an aperture 39 slightly larger in diameter than the trunnion 22.

In the completed spider and yoke assembly, a washer 40 having an internal diameter slightly greater than the trunnion 20 bridges the gap between the trunnion 20 and the bore 32. Thermoplastic bushings 42 molded in situ provide the bearings for the trunnions 20 and 22.

Figure 2:
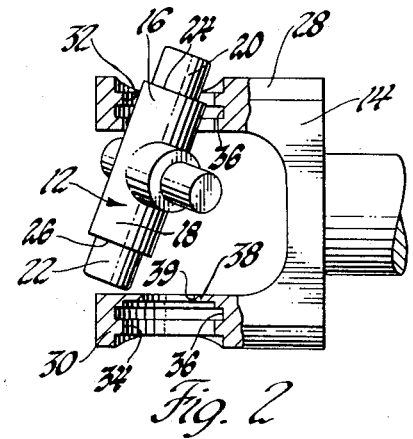
FIG. 2 is a front view of a spider and yoke being assembled in accordance with my invention and shows the relationship of the two parts during the initial stages of assembly.

The spider and yoke assembly just described is assembled in accordance with my invention in the following manner. The spider 12 is canted with respect to the yoke 14 and the spider leg 16 is inserted in the oversize bore 32 of the yoke ear 28 from which position the spider 12 is swung past the yoke ear until the trunnion 22 aligns with the aperture 39 of the integral flange on the ear 30. FIG. 2 shows the spider 12 after insertion of the leg 16 in the bore 32 with the spider 12 in the process of being swung past the ear 30 and into alignment with the aperture 39. The ear 28 is preferably disposed above the ear 30 during these and most of the subsequent operations.

Figure 3:
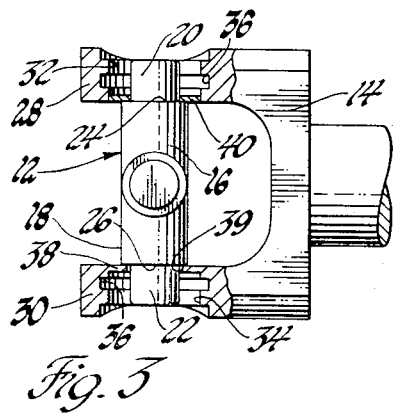
FIG. 3 is a view similar to FIG. 2 and shows the relationship of the parts shown in FIG. 2 during a subsequent stage of assembly and shows the addition of a washer to the assembly.

When the trunnion 22 is aligned with aperture 39 the spider 12 is moved axially inserting the trunnion 22 into the bore 34 through the aperture 39 until the shoulder 26 on the spider 12 rests on the flange 38. A washer 40 is then inserted into the open end of the bore 32 to center the spider 12 on the yoke 14. FIG. 3 shows the spider and yoke assembly after insertion on the trunnion 22 into the aperture 39 and bore 34 and after the washer 40 has been inserted into the bore 32 and has come to rest on the shoulder 24 to span the gap between the bore 32 and the trunnion 20.

Figure 4:
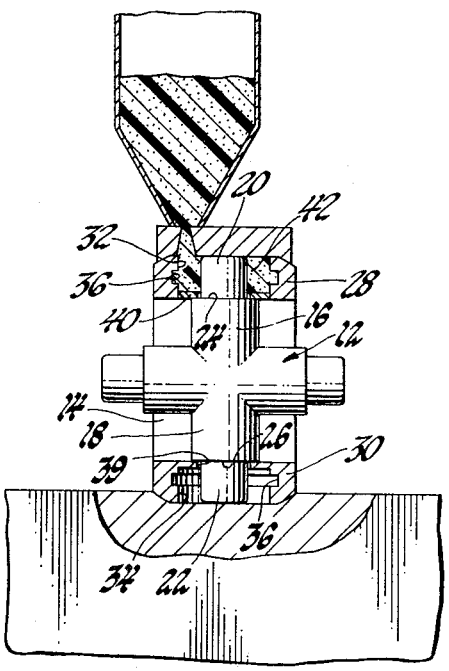
FIGS. 4 and 5 show injection molding steps utilized in the assembly of a spider and yoke in accordance with my invention.

Referring to FIG. 4, a thermoplastic such as Delrin (a trademark for acetal resins), nylon or polyethylene is then injection molded into the cavity between the trunnion 20 and the bore 32 which is sealed at its lower end by the washer 40 to form the upper bearing bushing 42. The type of thermal plastic which is injection molded will vary with the physical requirements of the assembly, however, the thermoplastic must have suitable bearing properties for the purpose intended. Upon cooling the thermoplastic shrinks slightly with the more significant shrinkage usually occurring at the outer circumference of the bearing bushings. Consequently, the bore 32 includes a circumferential groove 36 which is filled during the injection molding so that the thermoplastic bearing bushing formed has a collar portion which mechanically locates the bushing axially with respect to the yoke ear and guards against axial displacement. Thus, in many instances, the outer circumference of the bearing bushing provides the primary bearing surface which is advantageous as it provides a larger bearing surface than the inner circumference of the bearing bushing.

Figure 5:
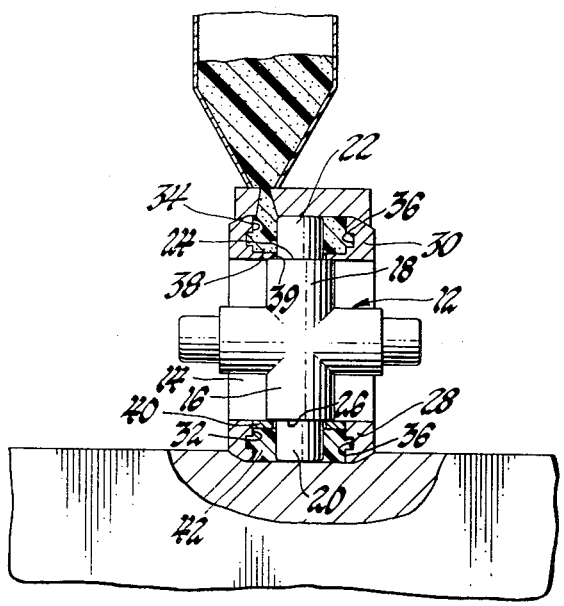

After formation of the upper bearing bushing 42, the assembly is rotated 180° until the ear 30 is disposed above the ear 28 as shown in FIG. 5. A thermoplastic is then injection molded into the cavity formed by the bore 34, integral flange 38 and trunnion 22. Selection of the thermoplastic material is based on the same criteria as in the previous step.

A second yoke may be assembled to the other two legs of the spider 12 in the same manner to provide a complete Cardan assembly.

I wish it to be understood that I do not desire to be limited to the exact details of construction shown and described, for obvious modifications will occur to a person skilled in the art.

I claim:

1. The method of assembling a spider to a yoke comprising the steps of forming a unitary cross-shaped spider having first and second pairs of diametrically opposed legs arranged in a perpendicular relationship with the legs of said first pair each terminating in a trunnion of reduced diameter and each having an annular shoulder adjacent said trunnion, forming a yoke having integral ears with substantially parallel confronting inboard faces spaced apart substantially equally to the distance between said annular shoulders with one of said ears having a first bore with a diameter substantially larger than the diameter of one of said legs of said first pair but smaller than the distance between the ends of said second pair and an annular groove opening into said first bore and the other of said ears having an aperture with a diameter at least as large as the diameter of said trunnion on said other leg of said first pair but less than the maximum diameter of said shoulder on said other leg, inserting said one leg of said first pair into said first bore from the inboard face of said one ear until said trunnion on said other leg is freely movable into the space between said confronting faces, moving said trunnion on said other leg into the space between said confronting faces and inserting said trunnion on said other leg into said aperture in said other ear until said annular shoulder on said other leg abuts said other ear at portions thereof adjacent said aperture and said trunnion on said one leg is aligned in said first bore, disposing a washer in said first bore around said trunnion on said one leg and against said annular shoulder on said one leg, said washer substantially bridging the space between said trunnion on said one leg and said first bore centering said trunnion therein and forming a generally annular cavity defined by said trunnion, said washer, said first bore and said annular groove, and molding a synthetic, organic thermoplastic polymeric material having good bearing characteristics in said cavity to form a plastic bearing bushing for said trunnion on said one leg which pivotally secures said spider to said yoke.

2. The method as defined in claim 1 wherein said synthetic, organic thermoplastic polymeric material is selected from the group consisting of nylon, polyethylene and acetal resins.

3. The method as defined in claim 1 wherein said last mentioned step consists of injection molding.

4. The method as defined in claim 3 wherein said synthetic, organic thermoplastic polymeric material is selected from the group consisting of nylon, polyethylene and acetal resins.

5. The method of assembling a spider to a yoke comprising the steps of forming a unitary cross-shaped spider having first and second pairs of diametrically opposed legs arranged in a perpendicular relationship with the legs of said first pair each terminating in a trunnion of reduced diameter and each having an annular shoulder adjacent said trunnion, forming a yoke having integral ears with substantially parallel confronting inboard faces spaced apart substantially equally to the distance between said annular shoulders with one of said ears having a first bore with a diameter substantially larger than the diameter of one of said legs of said first pair but smaller than the distance between the ends of said second pair and an annular groove opening into said first bore and the other of said ears having a second bore with a diameter substantially larger than the diameter of the other of said legs of said first pair and a second annular groove opening into said second bore, said other ear having an integral flange having a surface coplanar with the parallel confronting inboard face on said other ear, said integral flange defining an aperture aligned with said second bore and having a diameter at least as large as the diameter of said trunnion on the other leg of said first pair but less than the maximum diameter of said shoulder on said other leg, inserting said one leg of said first pair into said first bore from the inboard face of said one ear until said trunnion on said other leg is freely movable into the space between said confronting faces, moving said trunnion on said other leg into the space between said confronting faces and inserting said trunnion on said other leg into said aperture and said second bore in said other ear until said annular shoulder on said other leg abuts said surface on said flange adjacent said aperture thereby forming a generally annular cavity defined by said trunnion, said flange, said second bore and said second annular groove and disposing said trunnion on said one leg in said first bore, disposing a washer in said first bore around said trunnion on said one leg and against said annular shoulder on said one leg, said washer substantially bridging the space between said trunnion on said one leg and said first bore centering said trunnion therein and forming a second generally annular cavity defined by said trunnion, said washer, said first bore and said annular groove, and molding a synthetic, organic thermoplastic polymeric material having good bearing characteristics in said cavities to form plastic bearing bushings for said trunnions on said legs of said first pair which pivotally secures said spider to said yoke.

6. The method as defined in claim 5 wherein said synthetic, organic thermoplastic polymeric material is selected from the group consisting of nylon, polyethylene and acetal resins.

7. The method as defined in claim 5 wherein said last mentioned step consists of injection molding.

8. The method as defined in claim 7 wherein said synthetic, organic thermoplastic polymeric material is selected from the group consisting of nylon, polyethylene and acetal resins.

* * * * *